(12) United States Patent
Gieras et al.

(10) Patent No.: US 8,222,775 B2
(45) Date of Patent: Jul. 17, 2012

(54) ELECTROMECHANICAL ENERGY HARVESTING SYSTEM

(75) Inventors: Jacek F. Gieras, Glastonbury, CT (US); Jae-Hyuk Oh, Tolland, CT (US); Mihai Huzmezan, White Rock, CA (US); Harshad S. Sane, Waterbury, CT (US)

(73) Assignee: Chubb International Holdings Limited, Sunbury-On-Thames (GB)

( * ) Notice: Subject to any disclaimer, the term of this patent is extended or adjusted under 35 U.S.C. 154(b) by 0 days.

(21) Appl. No.: 13/221,130

(22) Filed: Aug. 30, 2011

(65) Prior Publication Data

US 2011/0309618 A1 Dec. 22, 2011

Related U.S. Application Data

(62) Division of application No. 12/086,233, filed as application No. PCT/US2005/044799 on Dec. 9, 2005, now Pat. No. 8,030,807.

(51) Int. Cl.
*H02K 33/00* (2006.01)
*H02K 35/00* (2006.01)
(52) U.S. Cl. .................. 310/25; 310/339; 290/1 R
(58) Field of Classification Search .......... 290/1 R; 310/339, 331, 25, 330
See application file for complete search history.

(56) References Cited

U.S. PATENT DOCUMENTS

| | | |
|---|---|---|
| 3,064,096 A | 11/1962 | Bosch |
| 3,161,793 A | 12/1964 | Laithwait |
| 3,421,309 A | 1/1969 | Bennett |
| 3,457,522 A | 7/1969 | Kosta, Jr. |
| 3,480,808 A * | 11/1969 | Rieth ............................. 310/25 |
| 3,506,897 A | 4/1970 | Clifford |
| 3,581,129 A | 5/1971 | Ganter et al. |
| 3,641,373 A | 2/1972 | Elkuch |
| 3,786,413 A | 1/1974 | Ross et al. |
| 4,227,142 A | 10/1980 | Jarret et al. |
| 4,318,016 A | 3/1982 | McMullan et al. |
| 4,387,318 A | 6/1983 | Kolm et al. |
| 4,410,827 A * | 10/1983 | Kogure ........................ 310/370 |
| 4,470,121 A | 9/1984 | Ebert |
| 4,500,827 A * | 2/1985 | Merritt et al. ..................... 322/3 |
| 4,536,674 A | 8/1985 | Schmidt |
| 5,191,688 A * | 3/1993 | Takizawa et al. ............ 29/25.35 |
| 5,285,127 A * | 2/1994 | Egley et al. ................... 310/366 |

(Continued)

FOREIGN PATENT DOCUMENTS

JP 03178573 A 8/1991

(Continued)

OTHER PUBLICATIONS

Amirtharajah, R., et al., "Self-Powered Signal Processing Using Vibration-Based Power Generation", IEEE Journal of Solid State Circuits, vol. 33, No. 5, May 1998. pp. 687-695.

(Continued)

*Primary Examiner* — Julio Gonzalez
(74) *Attorney, Agent, or Firm* — MH2 Technology Law Group LLP

(57) ABSTRACT

A method of electromechanical energy harvesting includes sensing electrical current generated by relative movement of a coil and a magnetic flux source produced by movement of a cantilevered beam in response to ambient vibration energy, determining a vibration characteristic of the ambient vibration energy, and adjusting an effective flexible length of the cantilevered beam as a function of the vibration characteristic and the sensed electrical current.

17 Claims, 5 Drawing Sheets

U.S. PATENT DOCUMENTS

| | | | |
|---|---|---|---|
| 6,279,406 | B1 | 8/2001 | Li et al. |
| 6,407,484 | B1 | 6/2002 | Oliver et al. |
| 6,835,463 | B2 | 12/2004 | Srinivasan |
| 6,858,970 | B2 | 2/2005 | Malkin et al. |
| 6,936,937 | B2 | 8/2005 | Tu et al. |
| 6,984,902 | B1 | 1/2006 | Huang et al. |
| 7,161,254 | B1 | 1/2007 | Janky et al. |
| 7,166,953 | B2 * | 1/2007 | Heim et al. ............ 310/333 |
| 7,199,480 | B2 | 4/2007 | Fripp et al. |
| 7,208,845 | B2 | 4/2007 | Masters et al. |
| 7,224,077 | B2 | 5/2007 | Allen |
| 7,237,315 | B2 * | 7/2007 | Kubena et al. ............ 29/594 |
| 7,256,505 | B2 | 8/2007 | Arms et al. |
| 7,408,289 | B2 * | 8/2008 | Lee ............ 310/323.02 |
| 7,518,284 | B2 * | 4/2009 | Benslimane et al. ........ 310/311 |
| 7,525,205 | B2 * | 4/2009 | Mabuchi et al. ........... 290/1 R |
| 7,579,755 | B2 | 8/2009 | Clingman |
| 7,692,365 | B2 * | 4/2010 | Churchill et al. ............ 310/339 |
| 8,030,807 | B2 * | 10/2011 | Gieras et al. ............ 310/25 |
| 2002/0074891 | A1 | 6/2002 | Gieras et al. |
| 2002/0175520 | A1 | 11/2002 | Jacobsen |
| 2002/0175598 | A1 * | 11/2002 | Heim et al. ............ 310/328 |
| 2004/0012264 | A1 | 1/2004 | Burger et al. |
| 2004/0150529 | A1 | 8/2004 | Benoit et al. |
| 2005/0087019 | A1 | 4/2005 | Face |
| 2005/0230973 | A1 | 10/2005 | Fripp et al. |
| 2007/0114890 | A1 | 5/2007 | Churchill et al. |
| 2008/0136562 | A1 | 6/2008 | Kulah et al. |
| 2010/0164711 | A1 | 7/2010 | Arms et al. |

FOREIGN PATENT DOCUMENTS

| | | | |
|---|---|---|---|
| WO | WO 2006046989 A1 | 5/2006 | |

OTHER PUBLICATIONS

Ching, N.N.H., et al., "A laser-micromachined multi-modal resonating power transducer for wireless sensing system", Sensors and Actuators, Elsevier, vol. A 97-98, 2002, pp. 685-690.

Choi, H.Y., et al., "Performance Evaluation of Permanent Magnet Linear Generator for Charging the Battery of Mobile Apparatus", Int. Conf. on Electr. Machines ICEM'2004, Brugges, Belgium, 2004.

Glynne-Jones, P., et al., "An electromagnetic, vibration-powered generator for intelligent sensor systems", Sensors and Actuators, Elsevier, vol. A110, 2004, pp. 344-349.

Lee, J.M.H., et al., "Vibration-to-Electrical Power Conversion Using High-Aspect-Ratio MEMS Resonators", Power MEMS Conf., Chiba, Japan, Dec. 2003 (15 pages).

Li, W.J., "Wireless Sensors with Integrated Vibration-induced Power Generator", Chinese University of Hong Kong, Integrated Sensors and Actuators for Robotics and Automation Applications IROS 2009 (39 pages).

Meninger, S., et al., "Vibration-to-Electric Energy Conversion", IEEE Trans. on VLSI Systems, vol. 9, No. 1, Feb. 2001, pp. 64-76.

Shearwood, C., et al., "Development of an Electromagnetic Microgenerator", Electronics Letters, Aug. 1997 pp. 883-884.

Shenck, N.S., et al., "Energy Scavenging with Shoe-Mounted Piezoelectrics", IEEE Micro, vol. 21, No. 3, May-Jun. 2001, from <www.computer.org/micro/homepage/may_june/shenck_print.html> (9pages).

Sterken, T., et al., "Power Extraction from Ambient Vibration", Catholic University of Leuven, Leuven, Belgium, in Proc. of Workshop on Semiconductor Sensors, Nov. 2002 pp. 680-683.

Williams C.B., et al., "Analysis of a Micro-Electric Generator for Microsystems", 8th Intern. Conf. on Solid-State Sensors and Actuators and Eurosensors IX, Stockholm, Sweden, 1995. pp. 369-372.

Bodson. M., et al., "Adaptive Algorithms for the Rejection of Sinusoidal Disturbances with Unknown Frequency", Automatica, vol. 33, No. 12, pp. 2213-2221, Dec. 1997.

Regalia, P.A., "An Improved Lattice-Based Adaptive", IIR Notch Filter, IEEE Trans. on Signal Proc., 39(9),. Sep. 1991, pp. 2124-2128.

Murphy, J.F. "Transverse Vibration of a Simply Supported Beam with Symmetric Overhang of Arbitrary Length." Journal of Testing and Evaluation, JTEVA, vol. 25,. No. 5, pp. 522-524, Sep. 1997.

Whitney, S. "Vibrations of Cantilever Beams: Deflection, Frequency, and Research Uses." Website: <http://em-ntserver.unl.edu/Mechanics-Pages/Scott-Whitney/325hweb/Beams.htm> Apr. 23, 1999, 10 pages.

Omega Sensors, Inc., "Energy Harvesting with Omega Sensor's V-Power Technology", (date unknown) 1 page.

International Search Report, Written Opinion, and International Preliminary Examination Report, International Application No. PCT/US05/44799.

* cited by examiner

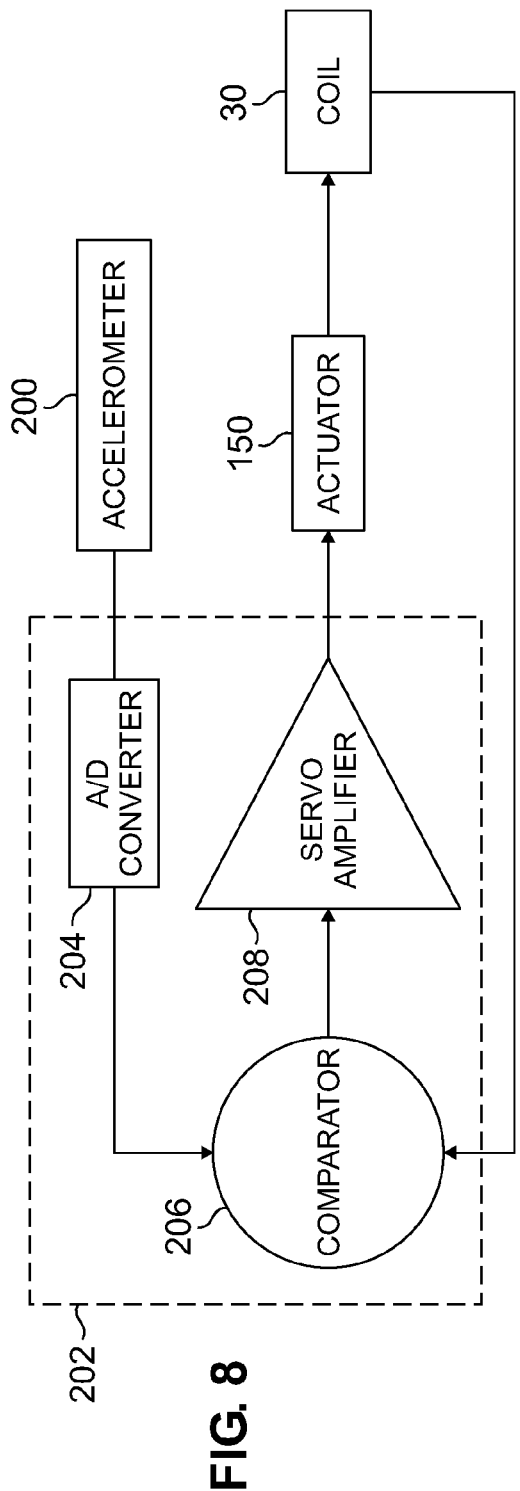
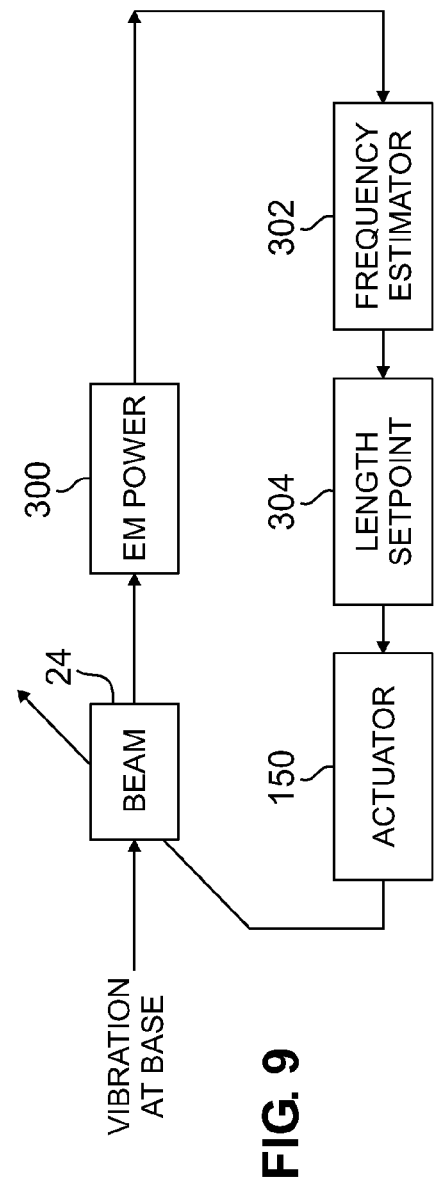
FIG. 8
FIG. 9

ELECTROMECHANICAL ENERGY HARVESTING SYSTEM

CROSS-REFERENCE TO RELATED APPLICATION(S)

This application is a division of U.S. patent application Ser. No. 12/086,233, filed Jun. 9, 2008, and in turn claims priority to PCT Application No. PCT US05/44799, filed Dec. 9, 2005.

BACKGROUND OF THE INVENTION

The present invention relates to generators, and more particularly to a system for harvesting kinetic energy.

Wireless sensor/actuator/relay nodes can be powered by harvesting energy from a range of sources present in the environment. In this context, "harvesting" kinetic energy is the generation of electrical power from ambient energy that is present in the environment. Energy harvesting has advantages over systems that require fuels or energy cells (e.g., batteries), as fuels and energy cells require labor to replenish or replace as they are inevitably depleted. Systems for harvesting energy include, for example, solar cells, thermoelectric generators, kinetic generators, radio wave powered systems, systems utilizing leakage magnetic or electric fields, etc. In some sensor/actuator/relay applications, the only source of available energy is ambient kinetic energy, for example: container security systems, animal tracking, and condition monitoring of machine parts (e.g., motors, turbines, pumps, gearboxes) and inaccessible structures (e.g., bridges, roads).

The nature of a kinetic energy harvesting mechanism in a self-contained system depends upon the application. Kinetic energy harvesting devices can be divided into two groups: (1) acceleration/vibration and spring mass system devices, e.g., kinetic watches, vibration generators, moving magnet linear generators, and (2) repeated straining physical deformation devices, e.g., piezoelectric generators and magnetic shape memory generators.

BRIEF SUMMARY OF THE INVENTION

A method of electromechanical energy harvesting according to the present invention includes sensing electrical current generated by relative movement of a coil and a magnetic flux source produced by movement of a cantilevered beam in response to ambient vibration energy, determining a vibration characteristic of the ambient vibration energy, and adjusting an effective flexible length of the cantilevered beam as a function of the vibration characteristic and the sensed electrical current.

BRIEF DESCRIPTION OF THE DRAWINGS

FIG. 8 is a block diagram illustrating a control system of an energy harvesting system according to the present invention.

FIG. 9 is a block diagram illustrating an alternative control system of an energy harvesting system according to the present invention.

DETAILED DESCRIPTION

The present invention relates to an electromechanical energy harvesting device that can be used to convert ambient kinetic energy to electrical energy. A magnetic flux source is supported at the free end of a spring-like cantilevered arm. The flux source can vibrate relative to a stationary coil and thereby generate an electrical current in the coil. The effective flexible length of the cantilevered arm can be optimized in relation to its natural or resonant frequency and the frequency of the (applied) ambient kinetic energy source, in order to improve the generation of electrical power.

Figure 1:
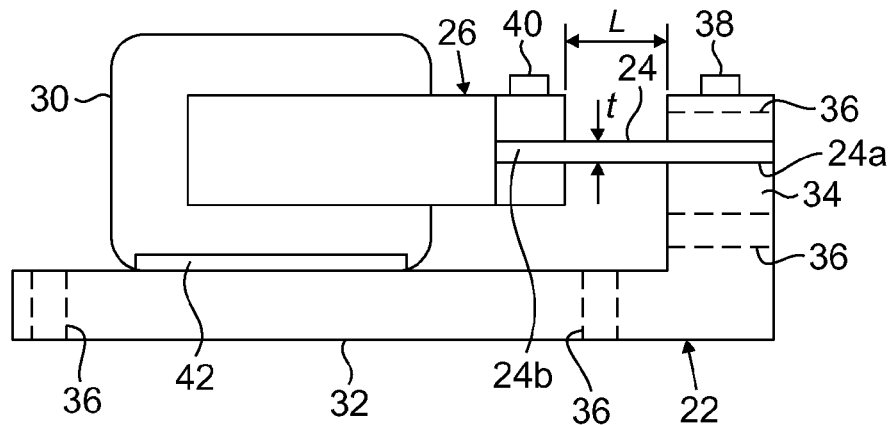
FIG. 1 is a side view of an energy harvesting system according to the present invention.
Figure 2:
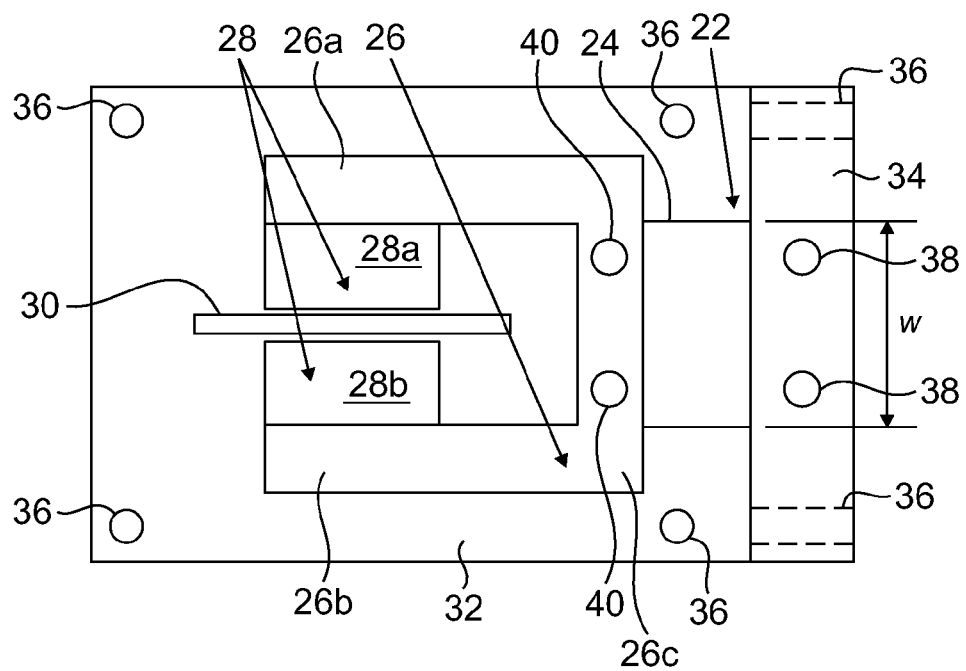
FIG. 2 is a top view of the energy harvesting system of FIG. 1.
Figure 3:
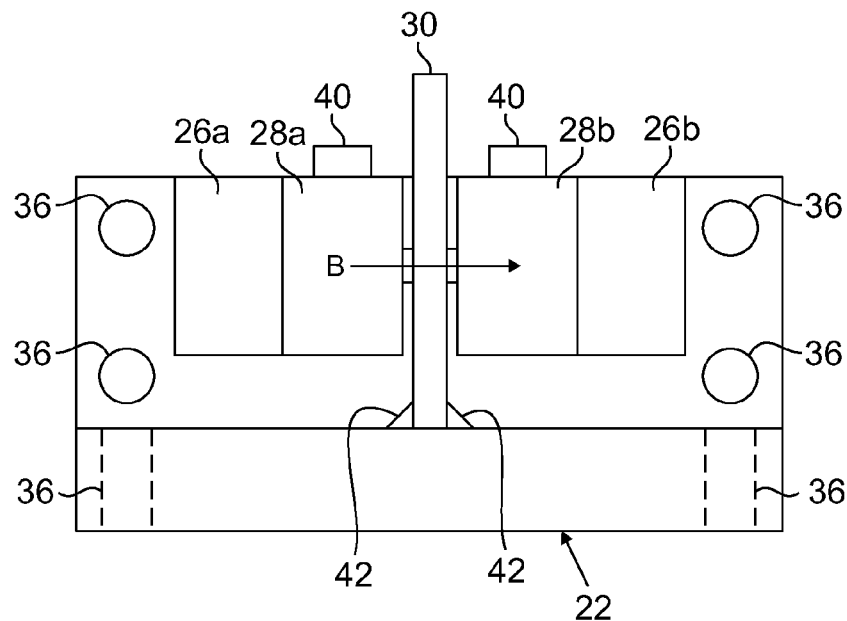
FIG. 3 is an end view of the energy harvesting system of FIGS. 1 and 2.

FIGS. 1, 2 and 3 illustrate one embodiment of an energy harvesting device 20 according to the present invention. The device 20 includes a base 22, a cantilevered arm 24, a yoke 26, a magnetic flux-generating assembly 28 that includes a plurality of permanent magnets (PMs) 28a and 28b, and a coil 30.

In the embodiment shown in FIGS. 1-3, the base 22 includes a lower portion 32 and a side portion 34, which is substantially perpendicular to the lower portion 32. A number of holes 36 are disposed in the base 22. The base 22 provides structural support for the device 20. The holes 36 of the base 22 facilitate engagement or mounting of the device 20 at a desired location, for example, by providing screws or other types of fasteners connected through the holes 36. In further embodiments, other types of connection features can be used as alternative to the holes 36. It should also be understood that in further embodiments, the base 22 can have other configurations. The base 22 is preferably formed of a nonmagnetic material.

The device 20 can be placed in a controlled air environment (e.g., in a vacuum). For example, the device 20 can be placed in a hermetically sealed enclosure (not shown). Controlling the air environment can reduce air friction that might otherwise undesirably limit movement of components of the device 20. Moreover, the controlled air environment can mitigate wear and damage to the device 20 (e.g., to help prevent rusting or other oxidation).

The cantilevered arm 24, synonymously called the cantilevered beam or the flat spring, has a fixed end 24a and a free end 24b. The fixed end 24a of the cantilevered arm 24 is attached to the side portion 34 of the base 22 with fasteners 38 (e.g., screws, adhesive, a mechanical interference connection, etc.). The cantilevered arm 24 has a width w, a thickness t, and an effective flexible length L, which is defined as the length along which the arm 24 can flex through a selected degree of freedom. In one embodiment, the cantilevered arm 24 can have the following dimensions: the width w is about 2-20 mm, the thickness t is about 0.05-0.6 mm, and the effective flexible length L is about 5-40 mm. The cantilevered arm 24 comprises a resilient material (e.g., resilient polymers, metallic materials, etc.) that permits bending. For example, the cantilevered arm 24 can comprise spring steel or copper beryllium.

The cantilevered arm 24 is configured such that its thickness t is substantially less than its width w and its length L.

That configuration means that the cantilevered arm 24 has substantially only one degree of flexural freedom and can vibrate only perpendicularly to the surface of the lower portion 32 of the base 22 of the device 20, that is, parallel to a plane of the coil 30.

The yoke 26 is attached to the free end 24b of the cantilevered arm 24 with fasteners 40 (e.g., screws, adhesive, a mechanical interference connection, etc.). In one embodiment, the yoke 26 has a U-shaped configuration with a pair of legs 26a and 26b extending from a base portion 26c. The yoke 26 can comprise a magnetic material (i.e., a material that conducts magnetic flux), for example, mild steel.

The magnetic flux-generating assembly 28 can comprise one or more elements attached to the yoke 26, for instance, the assembly 28 can comprise a pair of elements 28a and 28b attached to the legs 26a and 26b of the yoke 26, respectively. The magnetic flux-generating assembly 28 is in turn supported by the cantilevered arm 24. The magnetic flux-generating assembly 28 can produce a strong magnetic flux density in an air gap formed between poles of the opposed elements 28a and 28b.

Figure 4A:
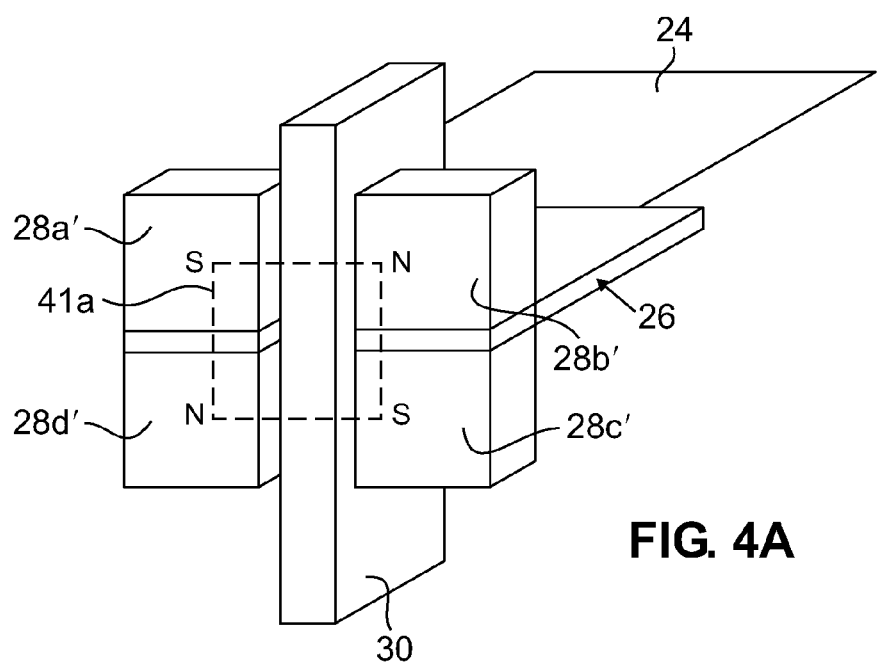
FIG. 4A is a perspective view of a portion of an embodiment of an energy harvesting system having four permanent magnets.

The magnetic flux-generating assembly 28 can comprise one or more rare-earth high energy permanent magnets (PMs), such as sintered NdFeB, and SmCo, or Alnico and Barium Ferrite PMs. According to the present invention, those PMs can have a number of alternative configurations. For example, FIG. 4A is a perspective view of a portion of an embodiment of an energy harvesting device 20 with a magnetic flux-generating assembly 28 having four PMs 28a', 28b', 28c' and 28d'. Using four PMs (28a'-28d'), a magnetic circuit 41a is formed such that magnetic flux passes through the air gap twice from one PM to another PM of different polarity. That is, magnetic flux passes across the air gap between PMs 28a' and 28b' and across the air gap between PMs 28c' and 28d'. The flux circuit is completed between PMs 28b' and 28c' as well as between 28d' and 28a' across portions of the legs 26a and 26b of the yoke 26. However, in this embodiment, the yoke 26 need not be made of a magnetic material (i.e., a material that conducts magnetic flux).

Figure 4B:
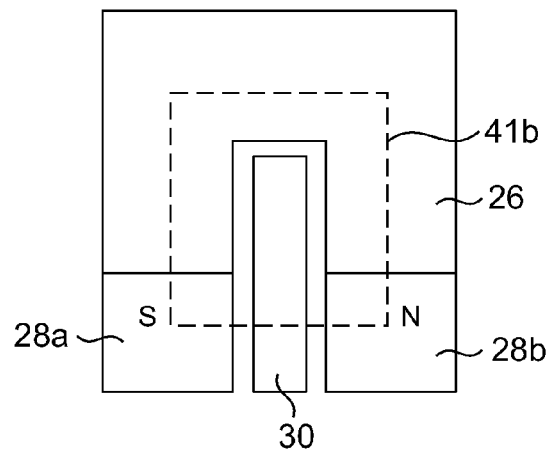
FIG. 4B is a perspective view of a portion of another embodiment of an energy harvesting system having two permanent magnets.

FIG. 4B is a perspective view of a portion of another embodiment of an energy harvesting device 20 with a magnetic flux-generating assembly 28 having two PMs 28a and 28b (a similar embodiment is shown in FIGS. 1-3). Using two PMs 28a and 28b, magnetic flux passes the air gap only once and a ferromagnetic return path for the flux is required to complete a flux circuit 41b. This return path is created by forming the yoke 26 of a magnetic material (e.g., mild steel). Where the yoke 26 is formed of a magnetic material, the mass of the vibrating system generally increases and cantilevered arm 24 of greater stiffness may be required for efficient performance.

Turning again to FIGS. 1-3, the coil 30 can be a stationary multi-turn coil, and can have a relatively flat, plate-like configuration. In one embodiment, the coil 30 has a width of about 5-50 mm, a length of about 5-50 mm and a thickness of about 0.5-4 mm. The coil 30 is positioned in the magnetic field of the magnetic flux-generating assembly 28. The coil 30 can be secured to the lower portion 32 of the base 22. Supports or braces 42 can be provided to better secure the coil 30 to the base 22. In one embodiment, the coil 30 can comprise turns of copper insulated wire (magnet wire).

The magnetic circuit formed with the magnetic flux-generating assembly 28 is suspended at the free end 24b of the cantilever arm 24. When the device 20 is placed on a shaking or vibrating body that provides an external source of vibration (i.e., ambient kinetic energy), the device 20 is excited by the external energy of vibration. The cantilever beam 24 (and the magnetic flux-generating assembly 28) has substantially only one degree of freedom, and can vibrate only perpendicularly to the surface of the lower portion 32 of the base 22 of the device 20, that is, parallel to the plane of the coil 30.

The coil 30 is positioned between the poles of the PMs 28a and 28b as the magnetic flux-generating assembly 28 vibrates. A mass m represents the mass of the magnetic flux-generating assembly 28 placed at the free end 24b of the cantilever arm 24. The cantilever arm 24 with PMs under the effect of forced motion (i.e., induced movement due to ambient kinetic energy) acts as a single-degree-of-freedom vibrating system that can be described by the following differential equation, where $F_m \sin(\omega t)$ is an external force with the amplitude $F_m$ considered for simplicity as changing sinusoidally with the time t, $\omega = 2\pi f$ is the angular frequency, f is the frequency and c is the coefficient of viscous damping:

$$m\ddot{x} + c\dot{x} + kx = F_m \sin(\omega t)$$

The external force $F_m \sin(\omega t)$ can be produced by an ambient kinetic energy source, such as, for example, a vibrating body on which the device 20 is placed.

As the magnetic flux-generating assembly 28 supported by the cantilevered arm 24 vibrates and moves relative to the coil 30, magnetic flux passes through the turns of the coil 30 and generates an electrical current therein. The induced voltage E in the coil 30 is proportional to the frequency f of the vibrating magnetic flux-generating assembly 28, the normal component (i.e., the component perpendicular to the plane of the coil) of the magnetic flux density B (see FIG. 3) produced by the magnetic flux-generating assembly 28, and the number of turns N of the coil 30, such that:

$$E \propto fBN$$

If a load impedance $Z_L$ (where $Z_L = R_L + jX_L$) is connected across terminals (not shown) of the coil 30, a closed electrical circuit is created. The rms current I in the electrical circuit and the rms voltage V across the load impedance $Z_L$ are, respectively:

$$I = \frac{E}{\sqrt{(R_c + R_L)^2 + (X_c + X_L)^2}}$$

$$V = I\sqrt{(R_c^2 + X_c^2)}$$

where $Z_c = R_c + jX_c$ is the internal impedance of the coil 30. The current I can then be rectified and used for charging an energy storage device such as a battery or a supercapacitor (not shown), which can, in turn, energize an electronic device (e.g., a wireless sensing/actuating/relaying system). Usually, the induced voltage E is not high enough to charge a battery, because about 2 Volts are generally required by a diode rectifier to charge a battery. However, in further embodiments, the induced voltage E can be increased by using an electronic quadrupler voltage rectifier or step-up transformer.

The moment of area (inertia) $I_a$ and stiffness k of a cantilevered arm 24 having a fixed end 24a and an opposite free end 24b are expressed by the following equations, where w is the width of the cantilever beam, t is its thickness, L is its effective flexible length, and $E_Y$ is its Young's modulus (i.e., its modulus of elasticity):

$$I_a = \frac{1}{12}wt^3$$

-continued $$k = \frac{3E_Y I_a}{L^3}$$

If the cantilevered arm 24 is loaded at its free end 24b with a mass m, the natural frequency of the spring-mass system (i.e., the system defined substantially by the cantilevered beam 24 loaded with the magnetic flux-generating assembly 28) is:

$$f_{nat} = \sqrt{\frac{k}{m}} = \frac{1}{2}\sqrt{\frac{E_Y w t^3}{mL^3}}$$

Thus, the natural frequency $f_{nat}$ of the spring-mass system, i.e., cantilever beam 24 loaded at its free end 24b with the mass m, can be simply controlled by changing the effective flexible length L of the arm 24.

The energy of vibration is converted into electrical energy with high efficiency—approaching a relative maximum efficiency—if the frequency f of the external source of vibration is close to or equal to the natural frequency $f_{nat}$ of the spring-mass system, as shown by the equations above. After solving the differential equation from above, the forced vibration amplitude is:

$$X_m = \frac{\frac{F_m}{k}}{\sqrt{\left[1-\left(\frac{f}{f_{nat}}\right)^2\right]^2 + \left[2\zeta\left(\frac{f}{f_{nat}}\right)\right]^2}}$$

and the magnification factor MF is:

$$MF = \frac{X_m}{\frac{F_m}{k}} = \frac{1}{\sqrt{\left[1-\left(\frac{f}{f_{nat}}\right)^2\right]^2 + \left[2\zeta\left(\frac{f}{f_{nat}}\right)\right]^2}}$$

where the damping ratio is $\zeta = c/c_c = c/(2mf_{nat})$, c is the actual damping coefficient and $c_c = 2mf_{nat}$ is the critical damping coefficient. The above function is maximized if:

$$\left(\frac{f}{f_{nat}}\right)^2 = 1 - 2\zeta^2$$

As seen by these equations, both the forced vibration amplitude $X_m$ and the magnification factor MF take maximum values for a low damping factor $\zeta$ and a frequency of vibration f that is equal to or very close to $f_{nat}$.

In practice, the frequency of vibration f can change across a wide range, usually from a few up to hundreds of cycles per second (Hz). The frequency of vibration f is highly dependent on the particular application and the particular source of ambient kinetic energy. Often, the external force $F_m \sin(\omega t)$ can be produced by a vibrating body on which the device 20 is placed. In this case, the differential equation given above is written as:

$$m\ddot{x} + c\dot{x} + kx = c\dot{x}_b + kx_b$$

where $x_b$ is the perpendicular vibration displacement at the base 22 of the device 20.

Other kinds of displacements, such as in-plane rotation $\theta_b$ at the base 22, can be translated to an equivalent perpendicular vibration displacement at the base 22 according to the following equation:

$$x_b(t) = L \sin(\theta_b(t))$$

Because the effect of rotations and displacements at the base 22 add linearly, all displacements of base 22 can be translated to an equivalent perpendicular vibration displacement $x_b$. The magnification factor MF is thus equivalently given by the following equation:

$$MF = \frac{X_m}{\frac{F_m}{k}} = \frac{\sqrt{1 + \left[2\zeta\left(\frac{f}{f_{nat}}\right)\right]^2}}{\sqrt{\left[1-\left(\frac{f}{f_{nat}}\right)^2\right]^2 + \left[2\zeta\left(\frac{f}{f_{nat}}\right)\right]^2}}$$

The magnification factor MF, according to the equation above, is maximized if:

$$\left(\frac{f}{f_{nat}}\right)^2 = \frac{2}{\sqrt{1+8\zeta^2}+1}$$

Hence, the magnification factor MF again takes relative maximum values for low damping factor $\zeta$ and frequency of vibration f equal to or very close to $f_{nat}$.

The electromechanical energy harvesting device 20 increases efficiency if the frequency of vibration f is close to the natural frequency $f_{nat}$ of the spring-mass system. Otherwise, the magnification factor MF is low, amplitude of vibration of the spring mass system $X_m$ is also low, and consequently the generated electric power may be less than desired (e.g., it may not be sufficient to charge a battery). Thus, in one embodiment, the effective flexible length L of the cantilevered arm 24 is selected such that the natural frequency $f_{nat}$ of the spring-mass system is close to a frequency of vibration f (from an external vibration source). The value of length L can be selected according to a predominant external vibration source, or otherwise, as desired.

To approach maximum efficiency at all times, the natural frequency $f_{nat}$ of the mass-spring system should be dynamically adjusted to the frequency f of the external source of vibration. This can be accomplished by adjusting the effective flexible length L of the cantilever beam, because the natural frequency is inversely proportional to $L^{3/2}$. In general, adjustment of the effective flexible length L of the cantilever beam can be done by selectively positioning a stabilizer along the cantilever beam using an electromechanical linear actuator and position control.

Figure 5:
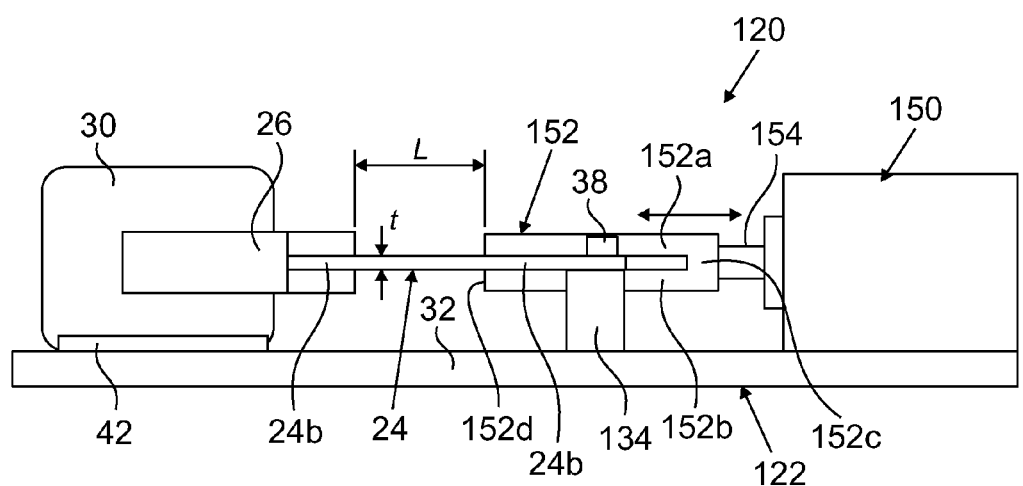
FIG. 5 is a side view of a self-adjustable energy harvesting system according to the present invention.
Figure 6:
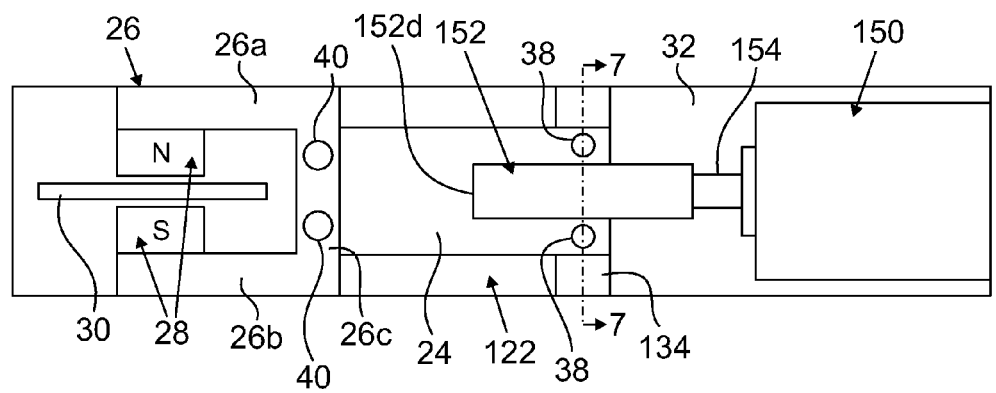
FIG. 6 is a top view of the self-adjustable energy harvesting system of FIG. 5.
Figure 7:
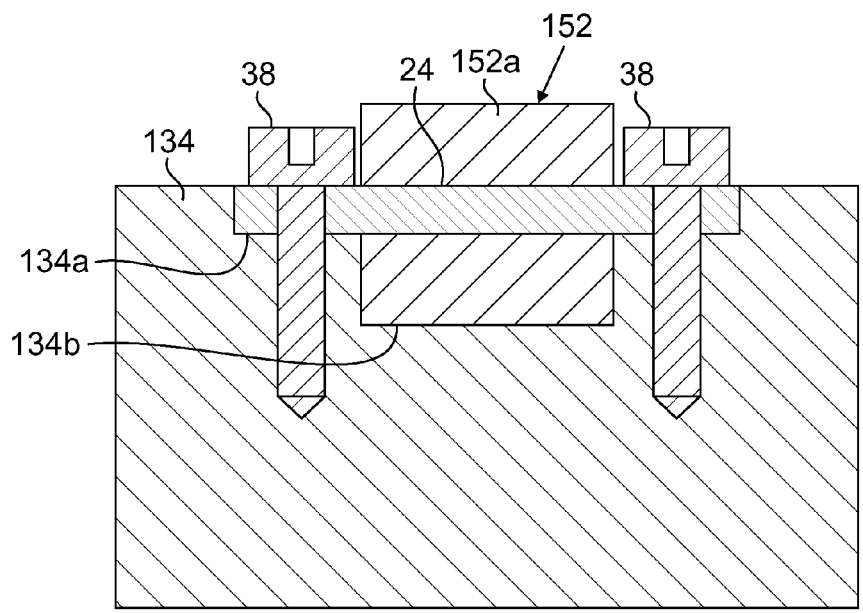
FIG. 7 is a cross-sectional view of a portion of the self-adjustable energy harvesting system of FIGS. 5 and 6, taken along line 7-7.

FIGS. 5 and 6 illustrate a self-adjustable energy harvesting device 120. FIG. 7 is a cross-sectional view of a portion of the self-adjustable energy harvesting device 120, taken along line 7-7 of FIG. 6. With device 120, the coil 30, the magnetic flux-generating assembly 28, and the cantilevered arm 24 are generally similar to those of the constant natural frequency energy harvesting device 20 shown and described with respect to FIGS. 1-3. The device 120 further includes a base 122, an actuator 150 and a stabilizer 152.

The base 122 has a lower portion 32 and a support 134 extending generally perpendicularly from the lower portion 32. As seen in FIG. 7, the support 134 defines a first recess 134a and a second recess 134b. A fixed end 24a of the cantilevered arm 24 is permanently fixed to the support 134 by fasteners 38.

The actuator 150 includes a linearly movable actuation piston 154. The actuator 150 can be any type capable of producing or inducing a linear displacement. However, in many applications, a small size of the actuator and very low power consumption are important. In such a situation, it is preferable to use a linear actuator with a rotary motor and roller screw or ball lead screw, as opposed to a direct drive linear motor. Although direct drive linear motors provide more accurate positioning at higher speeds, they are characterized by much lower force density than linear actuators with rotary motors and roller or ball lead screws. Even a powerful PM brushless or stepping linear motor may lack sufficient electromagnetic force density. Also, a linear motor consumes much more electrical energy than a linear actuator with rotary motor and roller or ball lead screw of a similar rating.

In the embodiment shown in FIGS. 5-7, the stabilizer 152 is a U-shaped member having a pair of legs 152a and 152b and a base portion 152c. The base portion 152c of the stabilizer 152 is connected to the actuation piston 154 of the actuator 150. The legs 152a and 152b of the stabilizer 152 are disposed at opposite surfaces (i.e., at top and bottom surfaces) of the cantilevered arm 24. The stabilizer 152 can slidably move relative to the cantilevered arm 24 and, in particular, a first end 152d of the stabilizer 152 can be extended past the fixed end 24a of the cantilevered arm 24 and toward its free end 24b. Apart from vibrational movements, the cantilevered arm 24 is relatively stationary while only the stabilizer is pushed or pulled by the actuation piston 154 of the actuator 150.

The cantilevered arm 24 extends into the first recess 134a of the support 134. The second recess 134b of the support 134 accepts the stabilizer 152, and serves as a guide for the stabilizer 152. The position of the stabilizer 152 relative to the cantilevered arm 24 is adjusted by the actuator 150. The natural frequency of the cantilevered arm 24 is controlled by moving the first end 152d of the stabilizer 152 closer or further from the free end 24b of the cantilevered arm 24. The stiffness of the stabilizer 152 (which can be selected as a function of the thickness of the stabilizer legs 152a and 152b) should be much higher than that of the cantilevered arm 24, otherwise the adjustment of the natural frequency would be weak.

As seen in FIG. 5, the effective flexible length L of the cantilevered arm 24, at any given time, is generally defined between the end portion 26c of the yoke 26 and the first end 152d of the stabilizer 152.

FIG. 8 is a block diagram illustrating an example of a control system for an energy harvesting device (e.g., the device 120). The control system includes an accelerometer 200 mounted on the cantilevered arm 24 and a microprocessor circuit 202 having an analog/digital (A/D) converter 204, a comparator 206 and a servo amplifier 208. It should be understood that FIG. 8 is a simplified diagram, and other components may be included that are not shown, for clarity.

The accelerometer 200 detects vibration of the energy harvesting device (e.g., the device 120) due to ambient energy and generates a frequency signal, which is sent to the comparator 206. The frequency of the current in the coil 30 is also sent as a signal to the comparator 206. The output frequency of the coil 30 is used as a feedback signal, following the induced voltage E in the coil 30. The comparator 206 is electrically connected to the servo amplifier 208, which is electrically connected in turn to the actuator 150.

In operation, the frequency of the current in the coil 30 is used as a feedback signal that is compared, by the comparator 206, with the frequency f of the source of vibration obtained from the accelerometer 200. The comparator 206 generates a frequency error signal. The frequency error signal is amplified by the servo amplifier 208, and the output current of the servo amplifier 208 is sent to the actuator 150 (i.e., the output current powers the stator windings of the actuator 150). The following algorithm can be used for providing stabilizer position control by regulating current i to the actuator 150:

$$i = \begin{cases} i_{max}, \text{ if } f_{nat} - f_{acc} > \Delta \\ \frac{i_{max}}{\Delta}(f_{nat} - f_{acc}), \text{ if } |f_{nat} - f_{acc}| \leq \Delta \\ -i_{max}, \text{ if } f_{nat} - f_{acc} < -\Delta \end{cases}$$

where $i_{max}$ is the maximum operational current for the actuator 150, $f_{nat}$ is the natural frequency of the spring-mass system, $f_{acc}$ is the main frequency component in the vibration (i.e., of the ambient kinetic energy source), and $\Delta$ is a constant that corresponds to the size of a minimum linear actuation interval for preventing excessive switching action (i.e., preventing excessive movement of the stabilizer 152 by the actuator 150).

If the frequency of vibration f increases, the effective flexible length L of the cantilevered arm 24 should be reduced. If the frequency of vibration f decreases, the effective flexible length L of the cantilevered arm 24 should be increased. In this embodiment, the actuator 150 does not need any encoder or other position sensor.

FIG. 9 is a block diagram illustrating an alternative control scheme that utilizes a frequency estimator. Electromechanical (EM) power 300 is generated by the device 120, and can be measured, for example, as current in the coil 30.

The unknown frequency f of vibration of the cantilever arm 24 can be estimated by a frequency estimator 302 (e.g., a microprocessor) using the following equations:

$$\ddot{z} + 2\zeta\omega_f\dot{z} + w_f^2 z = ky$$

$$\dot{\omega}_f + g(ky - 2\zeta\omega_f\dot{z})z = 0$$

where z is a state of the estimator, y is an appropriate measurably sinusoidal output (e.g., current or power 300) and $\omega_f$ is the estimate of the frequency of y. Then, a length setpoint 304 for adjusting the stabilizer 152 relative to the cantilevered arm 24 can be determined. The effective flexible length L of the cantilevered arm 24 can be adjusted (i.e., tuned) to the estimated vibration frequency $\omega_f$ using the equation:

$$L = \frac{1}{2}\left(\frac{E_y w r^3}{2m\omega_f^2}\right)^{1/3}$$

to generate the appropriate length setpoint 304 and to command the actuator 150 to move the stabilizer 152 accordingly.

In summary, the present invention describes a portable electromechanical energy harvesting device having a natural frequency of the cantilever beam selected to equal or approximate a frequency of an external vibration source. In one embodiment, the natural frequency of the cantilever beam is automatically continually adjustable to at least approximate a frequency of an external vibration source. Because the relative maximum generated energy occurs when mechanical resonance occurs, i.e. when the natural frequency of the cantilever beam-based vibrating system is the same or close to the input frequency of vibration for an external source, the self-adjustable device will approach maximum efficiency. The natural frequency of the cantilever beam is adjusted by changing the effective flexible length of the cantilever beam using a stabilizer positioned by an electromechanical actuator and position control. Potential applications of a system according to the present invention include: (1) wireless sensors installed in security systems of containers or trailers, (2) condition-based monitoring of machinery and structures; (2) implanted medical sensors; (3) wearable computers; (4) intelligent environments (e.g., "smart spaces"), etc.

It should be recognized that the present invention provides numerous benefits, including: a simple construction; low cost due to reduced number of parts, easy fabrication, and easy installation; high efficiency of conversion of vibrational energy into electrical energy due to adjustable length of a cantilever beam and adjustment of its natural frequency to the frequency of external vibration; no external electrical power and wiring is required; environmentally friendly design and operation; eliminates the need for slip rings and induction loops; maintenance free, as it does not require battery replacement; and high reliability.

Although the present invention has been described with reference to several alternative embodiments, workers skilled in the art will recognize that changes may be made in form and detail without departing from the spirit and scope of the invention. For instance, the shape and positioning of individual components of an energy harvesting system according to the present invention can vary as desired. Moreover, different control schemes, control algorithms, and control circuits can be used to adjust the effective flexible length of the cantilevered arm.

What is claimed is:

1. A method of electromechanical energy harvesting comprising:
    detecting electrical current generated by relative movement of a coil and a magnetic flux source produced by movement of a cantilevered beam in response to ambient vibration energy;
    determining a vibration characteristic of the ambient vibration energy; and
    adjusting an effective flexible length of the cantilevered beam as a function of the vibration characteristic and the detected electrical current,
    wherein the effective flexible length of the cantilevered beam is adjusted such that ambient vibration energy causes the cantilevered beam to vibrate at approximately a resonant frequency.

2. The method of claim 1, wherein the effective flexible length is selected by adjustment of a stabilizer arm along the cantilevered beam.

3. The method of claim 1, wherein the vibration characteristic is frequency of the ambient vibration energy.

4. An electromechanical energy harvesting system comprising:
    a cantilevered beam;
    a coil;
    a magnetic flux source, wherein the coil and the magnetic flux source are configured to generate electrical current by relative movement therebetween in response to ambient vibration energy that produces vibration of the cantilevered beam;
    a processor configured to determine a vibration characteristic of the ambient vibration energy; and
    a mechanism to adjust an effective flexible length of the cantilevered beam as a function of the vibration characteristic and the electrical current,
    wherein the processor provides a frequency estimator and wherein the vibration characteristic is an estimated vibration frequency of the cantilevered beam.

5. The system of claim 4, wherein the mechanism is a stabilizer arm adjustably positioned along the cantilevered beam.

6. The system of claim 5, wherein the stabilizer arm is U-shaped and extends along and opposite sides of the cantilevered beam.

7. The system of claim 4, wherein the vibration characteristic is frequency of the ambient vibration energy.

8. The system of claim 4, wherein the magnetic flux source is secured to a free end of the cantilevered beam.

9. The system of claim 4, wherein the magnetic flux source comprises a plurality of permanent magnets.

10. The system of claim 4 and further comprising:
    an accelerometer mounted to the cantilevered beam for sensing frequencies of the ambient vibration energy that produces vibration of the cantilevered beam.

11. An electromechanical energy harvesting system comprising:
    a cantilevered beam;
    a coil;
    a magnetic flux source, wherein the coil and the magnetic flux source are configured to generate electrical current by relative movement therebetween in response to ambient vibration energy that produces vibration of the cantilevered beam;
    a processor configured to determine a vibration characteristic of the ambient vibration energy as a function of the electrical current;
    an accelerometer mounted to the cantilevered beam for detecting frequencies of the ambient vibration energy that produces vibration of the cantilevered beam; and
    a mechanism to adjust an effective flexible length of the cantilevered beam as a function of the electrical current.

12. The system of claim 11, wherein the mechanism is further configured to adjust the effective flexible length of the cantilevered beam as a function of the vibration characteristic in conjunction with the electrical current.

13. The system of claim 11, wherein the mechanism is a stabilizer arm adjustably positioned along the cantilevered beam.

14. The system of claim 13, wherein the stabilizer arm is U-shaped and extends along and opposite sides of the cantilevered beam.

15. The system of claim 11, wherein the vibration characteristic is frequency of the ambient vibration energy.

16. The system of claim 11, wherein the processor provides a frequency estimator and wherein the vibration characteristic is an estimated vibration frequency of the cantilevered beam.

17. The system of claim 11, wherein the magnetic flux source is secured to a free end of the cantilevered beam.

* * * * *